United States Patent
Bremmer et al.

(10) Patent No.: US 9,162,419 B2
(45) Date of Patent: Oct. 20, 2015

(54) COMPOSITE STAPLE

(71) Applicant: Sikorsky Aircraft Corporation, Stratford, CT (US)

(72) Inventors: Jonathan Bremmer, Glastonbury, CT (US); Darryl Mark Toni, Madison, CT (US); Jeffrey G. Sauer, Woodbury, CT (US); William E. Hovan, Oxford, CT (US); Christian A. Rogg, New Milford, CT (US); Andrew Varga, Milford, CT (US); David M. Lent, Guilford, CT (US); Robert A. Lacko, Oxford, CT (US); Allan R. Macallister, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 134 days.

(21) Appl. No.: 14/044,468

(22) Filed: Oct. 2, 2013

(65) Prior Publication Data

US 2015/0093541 A1   Apr. 2, 2015

(51) Int. Cl.
| | |
|---|---|
| *B32B 7/08* | (2006.01) |
| *B32B 37/00* | (2006.01) |
| *B32B 3/26* | (2006.01) |
| *B29C 70/00* | (2006.01) |

(52) U.S. Cl.
CPC ............... *B32B 3/266* (2013.01); *B29C 70/00* (2013.01); *B32B 7/08* (2013.01)

(58) Field of Classification Search
CPC ........... Y10T 428/24174; B29C 65/56; B29C 66/721
USPC ................................................. 428/223, 122
See application file for complete search history.

(56) References Cited

U.S. PATENT DOCUMENTS

| | | |
|---|---|---|
| 5,506,018 A | 4/1996 | Jacob et al. |
| 6,051,089 A | 4/2000 | Palmer et al. |
| 6,406,580 B1 | 6/2002 | Campbell, Jr. |
| 6,739,861 B2 | 5/2004 | Cournoyer et al. |
| 6,823,918 B2 | 11/2004 | Grosskrueger et al. |
| 7,402,269 B2 | 7/2008 | Brown |
| 7,497,919 B2 | 3/2009 | Sneddon |
| 7,503,368 B2 | 3/2009 | Chapman et al. |
| 7,686,908 B2 | 3/2010 | Misciagna et al. |
| 7,959,753 B2 | 6/2011 | Nunez Delgado et al. |
| 7,972,430 B2 | 7/2011 | Millard et al. |
| 7,993,477 B2 | 8/2011 | Hethcock et al. |
| 8,168,023 B2 | 5/2012 | Chapman et al. |
| 8,220,991 B2 | 7/2012 | Safai et al. |
| 8,303,247 B2 | 11/2012 | Schlichting et al. |
| 8,303,758 B2 | 11/2012 | Chapman et al. |
| 8,343,298 B2 | 1/2013 | Rawlings et al. |
| 8,418,740 B2 | 4/2013 | Chapman et al. |
| 8,440,045 B2 | 5/2013 | Bremmer et al. |
| 8,481,136 B2 | 7/2013 | Sneddon |
| 2003/0190455 A1* | 10/2003 | Burgess et al. ............... 428/119 |
| 2010/0012783 A1* | 1/2010 | Kern et al. .................... 244/131 |
| 2011/0277937 A1 | 11/2011 | Hethcock et al. |
| 2011/0287208 A1 | 11/2011 | Velicki et al. |

* cited by examiner

*Primary Examiner* — Alexander Thomas
(74) *Attorney, Agent, or Firm* — Cantor Colburn LLP

(57) ABSTRACT

A laminate design is provided and includes a substrate formed to define through-holes, an initially uncured pre-preg laminate disposed proximate to the substrate and an initially uncured pre-preg staple. The staple includes a main member and legs extending from the main member and being disposable with the legs extending through the through-holes to pierce the laminate. The staple is co-curable with the laminate.

22 Claims, 1 Drawing Sheet

COMPOSITE STAPLE

FEDERAL RESEARCH STATEMENT

This invention derived from work done under Navy contract N00019-06-0081. The government has certain rights to this invention.

BACKGROUND OF THE INVENTION

The subject matter disclosed herein relates to composite staples and, more particularly, to co-cured composite staples for a composite design.

In various applications across many industries and technologies, there is often limited structural strength between plies or laminate designs with a skin the plies or laminate designs are attached to. This issue may be particularly noticeable in, for example, "L" or "T" shaped section frames.

Previously, the issues of limited structural strength between plies or laminate designs with the attached skin have been addressed by the use of metallic nails or procured tows of fiber to stick areas together. These solutions helped to increase shear strengths but loads leading to flat-wise pull-off remain low.

BRIEF DESCRIPTION OF THE INVENTION

According to one aspect of the invention, a laminate design is provided and includes a substrate formed to define through-holes, an initially uncured pre-preg laminate disposable proximate to the substrate and an initially uncured pre-preg staple. The staple includes a main member and legs extending from the main member and being disposable with the legs extending through the through-holes to pierce the laminate. The staple is co-curable with the laminate.

According to another aspect of the invention, a laminate design is provided and includes a substrate formed to define through-holes, a cured pre-preg laminate disposed to abut the substrate and a cured pre-preg staple including a main member and legs extending from the main member. The staple is disposed with the legs extending through the through-holes to pierce the laminate. The staple and the laminate are co-cured such that the staple pulls load from the laminate and away from the substrate.

According to yet another aspect of the invention, a method of assembling a laminate design is provided and includes forming a substrate with through-holes, disposing an uncured pre-preg laminate proximate to the substrate, inserting legs of an uncured pre-preg staple through the through-holes to pierce the laminate and co-curing the pre-preg laminate and the pre-preg staple.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, composite staples (such as fiber, tow or prepreg) are inserted through a skin having a captured portion that is attached to plies or laminate designs in, for example, "L" or "T" shaped sections in airframe composite structures. The composite staple will require tensile failure or pull-out of the fiber to fail. The co-cure of the staples (using the same prepreg process as layup) enhances a strength of the staple to the laminate joint. The size and number of the staples will control an overall strength of the joint. This will, in turn, lead to increased flat-wise pull-off strength of the skin as well as increased damage tolerance and shear strength.

Figure 1:
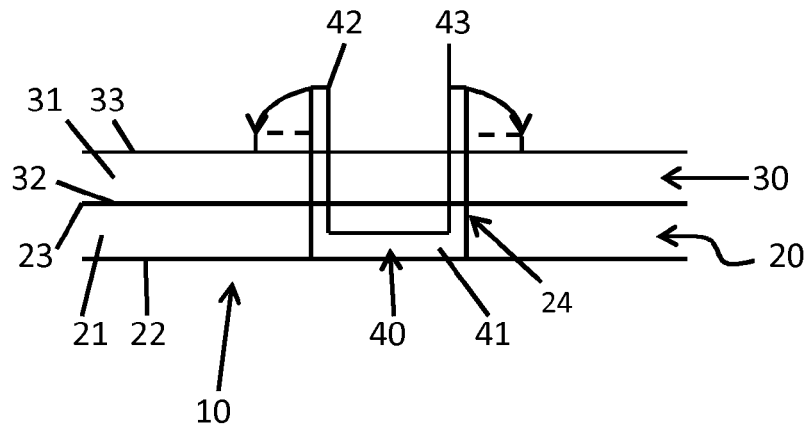
FIG. 1 is a side view of a laminate design in accordance with embodiments.
Figure 2:
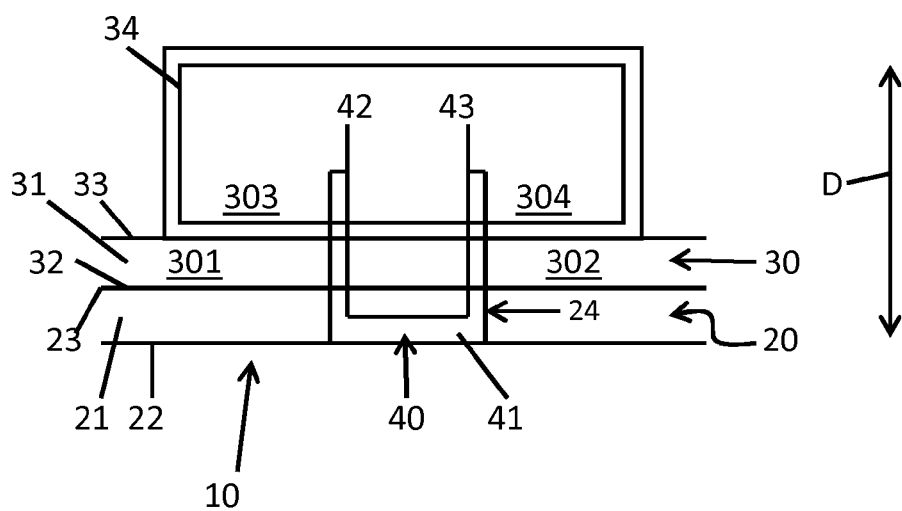
FIG. 2 is a side view of a laminate design in accordance with alternative embodiments.
Figure 3:
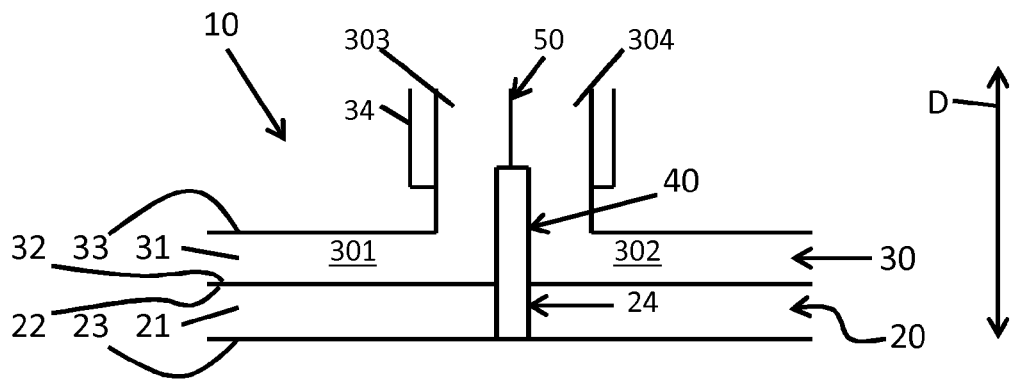
FIG. 3 is an elevational view of the laminate design of FIG. 2.

With reference to FIGS. 1-3, a laminate design 10 is provided. The phrase "laminate design" may refer to any layered assembly such as an assembly or layering of laminates or laminations or an assembly or layering of plies. The use of the phrase "laminate design" herein below is made for purposes of clarity and brevity and is not intended to limit the scope of the application in any way.

As shown, the laminate design 10 includes a substrate 20, an initially uncured pre-preg laminate 30 and an initially uncured pre-preg staple 40. It is to be understood that the term "pre-preg" is a shortened form of the term "pre-impregnated" and refers to a composite element that includes fibers and a matrix material, such as resin or epoxy. The fibers may be arranged as a weave or may be uni-directional and, in either case, are bonded together by the matrix material and/or other components during manufacture. The resin or epoxy is initially only partially cured to allow easy handling and may require that the pre-preg be cold stored. Eventually curing the pre-preg may require an oven or autoclave to finish complete polymerization.

The substrate 20 may be provided as an airfoil skin or some type of flooring material. In accordance with embodiments, the substrate 20 is formed of material with a high characteristic stiffness. The substrate 20 has a body 21 and first and second sides 22 and 23 on opposite sides of the body 21. The first and second sides 22 and 23 may be substantially planar and, in some cases, may be flat. The substrate 20 is formed to define two or more through-holes 24 that may be arranged in a line or in some other predefined formation.

The initially uncured pre-preg laminate 30 may be formed of epoxy or resin and fibers intermixed in the epoxy or resin. The initially uncured pre-preg laminate 30 is disposable at a location proximate to the substrate 20 and may be disposed to abut the substrate 20. In accordance with embodiments, the initially uncured pre-preg laminate 30 may be disposed to abut the substrate 20 in a flush formation.

The initially uncured pre-preg laminate 30 may, as shown in FIG. 1, include a body 31 and first and second sides 32 and 33 on opposite sides of the body 31. The first and second sides 32 and 33 may be substantially planar and, in some cases, may be flat. Alternatively or additionally, the initially uncured pre-preg laminate 30 may, as shown in FIGS. 2 and 3, be provided in first and second portions 301 and 302 with the first portion 301 including a first leg section 303 and the second portion 302 including a second leg section 304. In this case, the first and second portions 301 and 302 may be configured to meet along a seam 50 such that the first and second leg sections 303 and 304 abut one another in a flush formation. The seam 50 may be configured for alignment with the through-holes 24.

Stiffening elements 34 may be coupled to one or both of the first and second leg sections 303 and 304. The stiffening elements 34 may be substantially similarly shaped as the first and second leg sections 303 and 304 but may be slightly shorter in the depthwise-dimension D (see FIGS. 2 and 3).

The initially uncured pre-preg staple 40 may be formed of substantially similar material as the initially uncured pre-preg laminate 30. In accordance with embodiments, any dissimilarity between the materials of the initially uncured pre-preg laminate 30 and the initially uncured pre-preg staple 40 may not result in substantially different physical characteristics or responses to curing processes. The initially uncured pre-preg staple 40 includes a main member 41 and legs 42 and 43. The legs 42 and 43 extend from opposite ends of the main member 41. The initially uncured pre-preg staple 40 is disposable with the legs 42 and 43 extending through the through-holes 24 to pierce the initially uncured pre-preg laminate 30.

In accordance with embodiments, the piercing of the initially uncured pre-preg laminate 30 by legs 42 and 43 of the initially uncured pre-preg staple 40 refers to the legs 42 and 43 piercing through the epoxy or resin of the initially uncured pre-preg laminate 30 and pushing aside but not breaking or otherwise damaging the fibers. In the case of the embodiments of FIG. 1, this means that the legs 42 and 43 extend through the first and second sides 32 and 33 of the initially uncured pre-preg laminate 30 and can then be bent back toward the second side 33. In the case of the embodiments of FIGS. 2 and 3, this means that the legs 42 and 43 extend between the first and second leg sections 303 and 304 proximate to the seam 50 by a length that is slightly less than a total length of the legs 42 and 43.

In accordance with embodiments, the initially uncured pre-preg staple 40 is co-curable with the initially uncured pre-preg laminate 30. The curing process may be performed in an oven or autoclave and should result in the initially uncured pre-preg staple 40 and the initially uncured pre-preg laminate 30 being substantially simultaneously cured. Such substantially simultaneous curing permits the legs 42 and 43 to pull loads away from the other elements described above (i.e., the substrate 20 and the initially uncured pre-preg laminate 30) and to absorb such loads to increase an overall strength of the laminate design 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A laminate design, comprising:
a substrate formed to define through-holes;
an initially uncured pre-preg laminate disposable proximate to the substrate; and
an initially uncured pre-preg staple, the staple including a main member and legs extending from the main member and being disposable with the legs extending through the through-holes to pierce the laminate, the staple being co-curable with the laminate.

2. The laminate design according to claim 1, wherein corresponding portions of the substrate and the laminate are configured to abut in a flush formation.

3. The laminate design according to claim 1, wherein the substrate comprises an airfoil skin.

4. The laminate design according to claim 1, wherein the laminate comprises resin and fiber intermixed in the resin.

5. The laminate design according to claim 4, wherein the legs of the staple are configured to pierce through the resin but not the fiber of the laminate.

6. The laminate design according to claim 1, wherein the laminate is substantially flat on both sides.

7. The laminate design according to claim 6, wherein the legs of the staple are bendable toward a side of the laminate.

8. The laminate design according to claim 1, wherein the laminate comprises:
a first portion having a first leg section; and
a second portion having a second leg section,
the first and second portions being configured to meet along a seam such that the first and second leg sections abut one another in a flush formation.

9. The laminate design according to claim 8, wherein the seam is configured for alignment with the through-holes such that the legs of the staple pierce the laminate proximate to the seam.

10. The laminate design according to claim 8, further comprising stiffening elements attachable to the first and second leg sections.

11. A laminate design, comprising:
a substrate formed to define through-holes;
a cured pre-preg laminate having first and second opposite sides, the cured pre-preg laminate being disposed such that the first side abuts the substrate; and
a cured pre-preg staple including a main member and legs extending from the main member,
the staple being disposed with the main member in-plane with a portion of the substrate and the legs extending from the main member through the through-holes to pierce the laminate from the first side to the second side, the staple being co-cured with the laminate.

12. The laminate design accordingly to claim 11, wherein the staple and the laminate are co-cured such that the staple pulls load from the laminate and away from the substrate.

13. The laminate design according to claim 11, wherein corresponding portions of the substrate and the laminate abut in a flush formation.

14. The laminate design according to claim 11, wherein the substrate comprises an airfoil skin.

15. The laminate design according to claim 11, wherein the laminate is substantially flat on both sides.

16. The laminate design according to claim 11, wherein the laminate comprises:
a first portion having a first leg section; and
a second portion having a second leg section,
the first and second portions meeting along a seam such that the first and second leg sections abut in a flush formation.

17. The laminate design according to claim 16, wherein the seam is aligned with the through-holes such that the legs of the staple pierce the laminate proximate to the seam.

18. The laminate design according to claim 16, further comprising stiffening elements attached to the first and second leg sections.

19. A laminate design, comprising:
a substrate formed to define through-holes;
a cured pre-preg laminate disposed to abut the substrate; and a cured pre-preg staple including a main member and legs extending from the main member, the staple being disposed with the legs extending through the through-holes to pierce the laminate, the staple being co-cured with the laminate, wherein the legs of the staple bend toward a side of the laminate.

20. A method of assembling a laminate design, comprising:

forming a substrate with through-holes;

disposing an uncured pre-preg laminate proximate to the substrate;

inserting legs of an uncured pre-preg staple through the through-holes to pierce the laminate; and co-curing the pre-preg laminate and the pre-preg staple.

21. The method according to claim 20, further comprising forming the uncured pre-preg laminate to includes a first portion having a first leg section and a second portion having a second leg section, the first and second portions meeting along a seam such that the first and second leg sections abut in a flush formation.

22. The method according to claim 21, wherein the legs of the staple extend between the first and second leg sections.

\* \* \* \* \*